Dec. 8, 1936.                H. A. STAPLES                 2,063,470
         METHOD OF MAKING COPPER SHEATHED STEEL CORE CABLES
                        Filed May 28, 1935
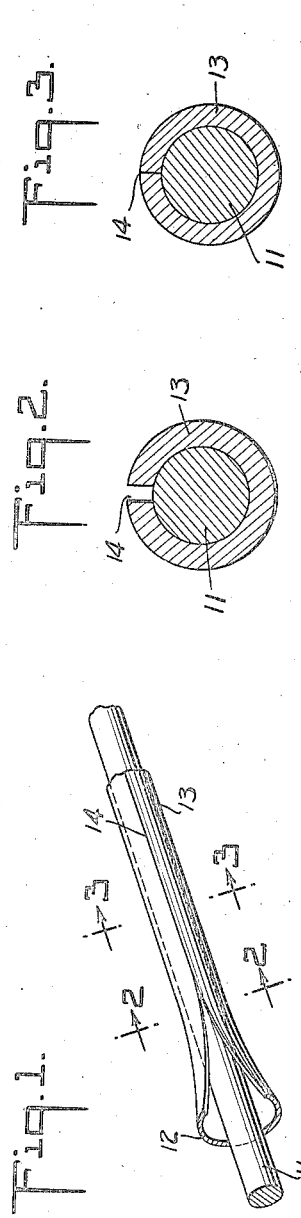
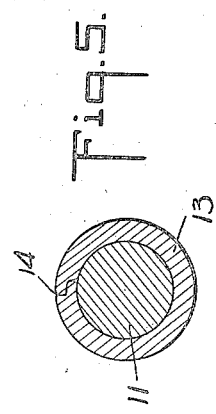
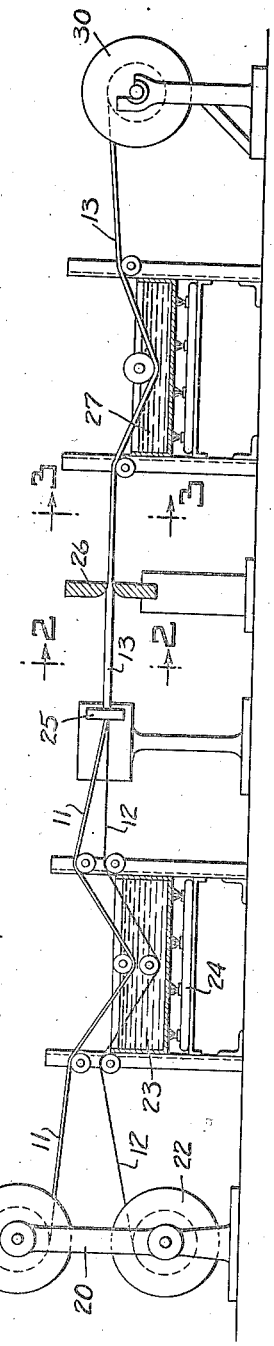
INVENTOR
Horace A. Staples
BY
ATTORNEY Patented Dec. 8, 1936

2,063,470

UNITED STATES PATENT OFFICE 2,063,470

METHOD OF MAKING COPPER SHEATHED STEEL CORE CABLES

Horace A. Staples, Plainfield, N. J., assignor to Phelps Dodge Copper Products Corporation, New York, N. Y., a corporation of Delaware Application May 28, 1935, Serial No. 23,844

1 Claim. (Cl. 29—188)

My invention relates to overhead electric cables, and more particularly to copper sheathed cables for use strung upon pole lines. Such a cable is primarily designed for the distribution of electrical current in rural districts where a particularly cheap construction is necessary because of the low density of population.

In supporting cables of this character upon poles, the minimum cross-section of copper required to carry the electrical load will be of insufficient tensile strength to hold its gross weight in service when strung upon the poles set with long spans. This necessitates either multiplying the poles at a greater pole cost or increasing the cross-section of the copper to make the wire strong enough to hold its gross weight in service. To overcome this expense is the principal object of my invention. By taking wire of high strength metal and coating it with tin and forming around this tinned wire a tinned non-ferrous metal strip so that the wire is entirely sealed within the strip, I produce a cable that will be of sufficient strength to stand up in service and at a minimum cost of manufacture.

I have discovered that if the copper sheath is applied to the steel wire so that it has a longitudinal seam parallel to the cable axis, the path of the current is entirely through the copper and not through any helical seams. With this method of manufacture the surface of the copper is smooth and free from corrugations which are a characteristic of helically applied tubes. Furthermore, when the tube is formed immediately after the strip and steel core have been tinned a bond is formed by virtue of the liquid tin on the surfaces of the core and strip producing a cable that does not present any bi-metal to the weather for battery or other corrosive effect.

With this construction the speed of manufacture may be greatly increased with corresponding decrease in cost of manufacture and the amount of the soldered or tinned seam exposed to electrical action is reduced to a minimum.

The foregoing and other features of my invention will now be described in connection with the accompanying drawing, forming part of this specification in which I have represented my cable in its preferred form, after which I shall point out more particularly in the claim those features which I believe to be new and of my own invention.

In the drawing:

Figure I is a perspective view of a section of my cable.

Figure II is a cross-section thereof along the line 2—2, Figure I.

Figure III is a cross-section thereof along the line 3—3, Figure I.

Figure IV is a diagrammatic side elevation of a machine employed to make my cable.

Figure V is a modified cross-section showing a lap joint in the longitudinal seam of the tube.

In the carrying out of my invention I employ a wire 11 as a core, around which I form from a non-ferrous metal strip 12 a tube 13 having a longitudinal seam 14.

Immediately prior to forming the strip 12 around the core, I tin the surfaces of the core and strip and before the tin cools the tube 13 is formed around the core and is bonded to the core 11 by the tin upon the surfaces of the core and strip. I may form the tube during the process of tinning. The open seam 14 may be either filled with solder or tin or the assembly may be drawn through a reducing die which will close the seam, as shown either in Figure III or V.

My cable may be made in various ways but the preferred form will now be described and the apparatus is diagrammatically illustrated in Figure IV. In the manufacture of my cable I may employ a stand 20 adapted to support a reel 21 which is a roll of high strength wire to be used as the core of my cable and a reel 22 which is a roll of copper strip 12 or other suitable non-ferrous metal. The wire 11 and strip 12 are passed through a tinning bath 23 which is kept in molten state by any well known heating means 24. Immediately the tinning operation is completed and before the heat has time to dissipate, the wire 11 and strip 12 are passed through a forming die 25 which forms the strip into a longitudinal seam tube 13 around the wire core 11. This forming die may be located in the tinning bath tank.

The cable when leaving the forming die 25 will have a cross-section like that shown in Figure II. The open seam 14 may then be filled with solder or tin or the cable 13 may be drawn through a reducing die 26.

The cable upon leaving the die 26 will have a cross-section like that shown in either Figure III or Figure V. The cable may then be passed through another tinning bath 27 to restore any tin which may have been accidentally removed by the die 26. From there the completed cable is rolled upon the reel 30.

I am aware that steel ingot has heretofore been covered by a covering of copper and the ingot rolled from a large billet to a compressed rod and drawn to size, but by this method the drawing produces an uneven covering of copper over the steel, and if a tube is made by this method the covering is a seamless tube of uneven thickness which is undesirable. With this construction the copper is welded directly to the steel whereas with my invention the tin or a third metal is between the copper and the steel which permits the bonding without affecting the high and uniform tensile strength of the wire, and produces a covering with substantially uniform thickness throughout the length of the cable.

I wish it distinctly understood that my cable herein described and illustrated is in the form in which I desire to construct it and that changes or variations may be made as may be convenient or desirable without departing from the salient features of my invention and I therefore intend the following claim to cover such modifications as naturally fall within the lines of invention. This cable may be used singly as an electrical cable where the copper tube will serve as the conductor, or it may be used by stranding a plurality of similar cables, or in combination with solid copper wires forming a special cable.

I claim:

A method of making a copper sheathed steel core cable comprising passing a core of steel wire through a tin bath, forming a sheath of copper into a tube with a longitudinal seam around the core prior to the hardening of the tin, drawing the copper covered core to close the seam and passing through a second bath of tin to replace any of the tin which may have been removed in the drawing operation.

HORACE A. STAPLES.